(12) United States Patent
Takeuchi

(10) Patent No.: US 7,802,036 B2
(45) Date of Patent: Sep. 21, 2010

(54) SERIAL COMMUNICATION SYSTEM USING AN I2C BUS AS A SERIAL BUS

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 347 days.

(21) Appl. No.: 12/011,586

(22) Filed: Jan. 28, 2008

(65) Prior Publication Data

US 2008/0189459 A1    Aug. 7, 2008

(30) Foreign Application Priority Data

Feb. 6, 2007    (JP)    ............................. 2007-026267
Nov. 2, 2007    (JP)    ............................. 2007-286007

(51) Int. Cl.
*G06F 13/00*    (2006.01)
(52) U.S. Cl. .......................... 710/110; 710/10; 709/208
(58) Field of Classification Search ................. 710/110, 710/10; 709/208; 700/245; 326/38; 717/174–177
See application file for complete search history.

(56) References Cited

U.S. PATENT DOCUMENTS

| 6,459,297 | B1 * | 10/2002 | Smiley | 326/38 |
| 7,401,170 | B2 * | 7/2008 | Kusumi et al. | 710/65 |
| 2006/0053420 | A1 * | 3/2006 | Soga | 717/174 |
| 2008/0046121 | A1 * | 2/2008 | Pao et al. | 700/245 |
| 2008/0215780 | A1 * | 9/2008 | Deshpande et al. | 710/110 |

FOREIGN PATENT DOCUMENTS

| JP | 07-200320 | 8/1995 |
| JP | 08-23582 | 1/1996 |
| JP | 11-53307 | 2/1999 |
| JP | 2000-242573 | 9/2000 |
| JP | 2005-128747 | 5/2005 |

* cited by examiner

*Primary Examiner*—Clifford H Knoll
(74) *Attorney, Agent, or Firm*—Harness, Dickey & Pierce, P.L.C.

(57) ABSTRACT

A serial communication system comprises: a master; a plurality of slaves; and a serial communication bus connecting the master and the plurality of slaves. The master is configured so as to perform peer-to-peer control, via the serial communication bus, of the plurality of slaves. Each of the plurality of slaves has: an I/O portion for controlling communication with the master; a control portion for controlling a driving portion of the slave; and a register portion. The register portion comprises a control program for the driving portion. The control program comprises a plurality of functions, and the register portion stores control information to which are allocated all or a portion of the plurality of functions corresponding to all or to a portion of the plurality of program steps. The master issues a command specifying the program step to each of the slaves, each of the slaves receiving the command via the serial communication bus, and each of the control programs of the plurality of slaves determines a program step specified by the command based on the received command, and the slaves simultaneously execute the function relevant to the relevant program step based on the control information.

10 Claims, 14 Drawing Sheets

FIG. 5

| DEVICE ID | PROGRAM STEPS FOR SIMULTANEOUS CONTROL ||||| 
|---|---|---|---|---|---|
| | 0 | 1 | 2 | .. | N |
| 1 | FUNCTION 11 | — | FUNCTION 12 | .. | FUNCTION 13 |
| 2 | FUNCTION 21 | FUNCTION 22 | FUNCTION 21 | .. | FUNCTION 23 |
| 3 | — | FUNCTION 31 | FUNCTION 32 | .. | FUNCTION 33 |
| .. | .. | .. | .. | .. | .. |
| M | — | FUNCTION M1 | FUNCTION M2 | .. | FUNCTION MN |

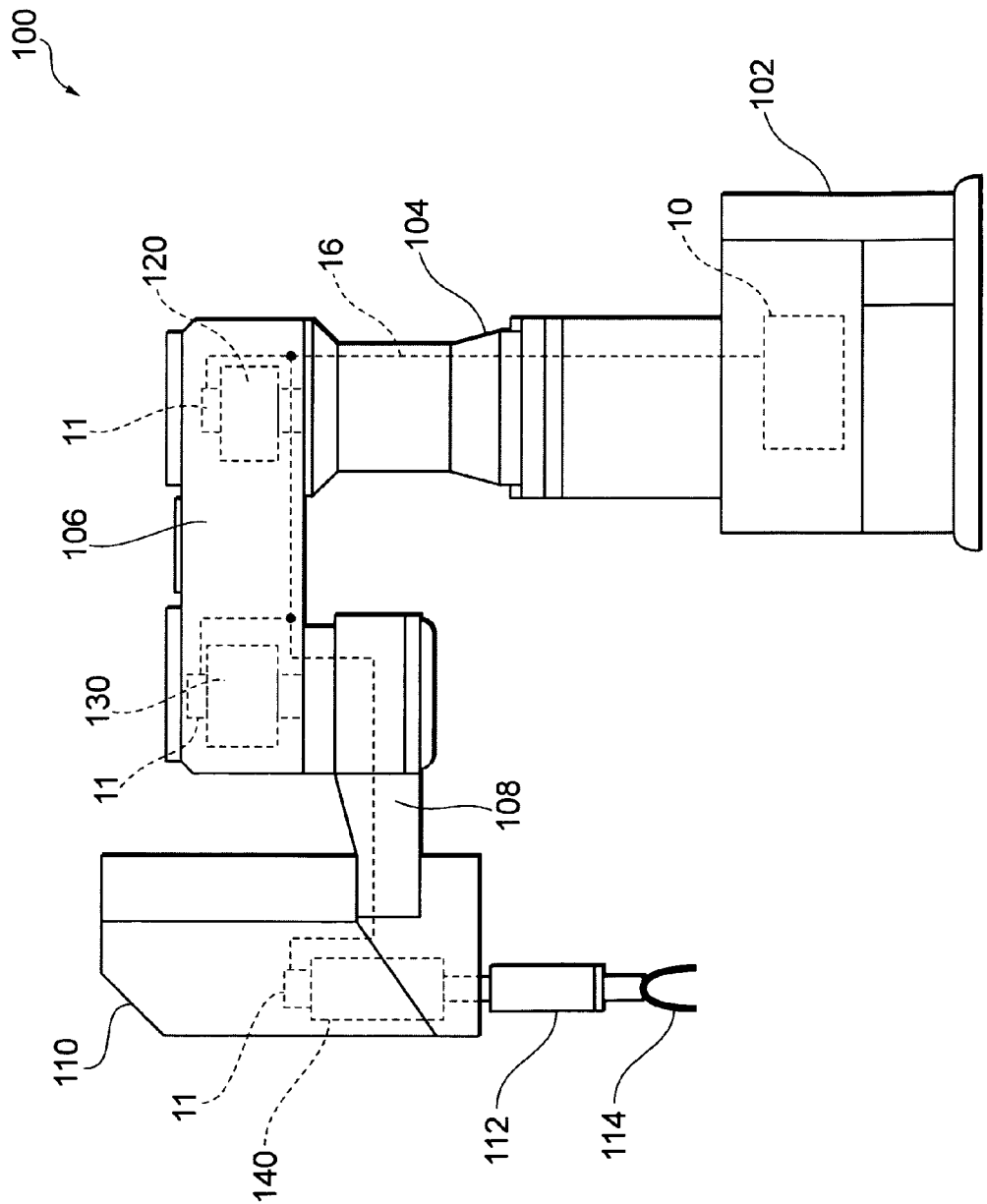

SERIAL COMMUNICATION SYSTEM USING AN I2C BUS AS A SERIAL BUS

CROSS-REFERENCE

The entire disclosure of Japanese Patent Application Nos. 2007-26267 filed on Feb. 6, 2007, and 2007-286007 filed on Nov. 2, 2007, are expressly incorporated by reference herein.

BACKGROUND

1. Technical Field

The present invention relates to a serial communication system between a master and a slave, and more particularly relates to a serial communication system which uses an I2C bus as a serial bus.

2. Related Art

"I2C bus" is an abbreviation for Inter-IC bus, also called an IIC bus or an I2C bus, and refers to a serial bus in which two signal lines, carrying a serial clock and serial data, connect a plurality of devices, to perform serial data transfer between a master (a managing device) and a slave (a managed device).

Technology employing such I2C buses for communication between devices has for example been disclosed in JP-A-2000-242573, JP-A-2005-128747, JP-A-7-200320, JP-A-8-23582, and JP-A-11-53307.

In a communication method using an I2C bus as described above, when starting communication the master must first acquire the right-to-use for the bus. Then, the master issues start conditions, and then issues the slave address to specify the slave.

In such master-slave global serial communication, there have been the problem that a master cannot simultaneously access a plurality of buses, the problem that a master and slave can always perform only one-to-one communication, and the problem that a master cannot simultaneously access a plurality of slaves.

SUMMARY

This invention was devised in light of these problems; an advantage of some aspects of the invention is the provision of a serial communication system in which, by means of a command issued from a master to a plurality of slaves by means of serial communication, a plurality of slaves can be simultaneously controlled.

In order to obtain such advantages, according to an aspect of this invention, a serial communication system comprises: a master; a plurality of slaves; and a serial communication bus connecting the master and the plurality of slaves. The master is configured so as to perform peer-to-peer control, via the serial communication bus, of the plurality of slaves. Each of the plurality of slaves has: an I/O portion for controlling communication with the master; a control portion for controlling a driving portion of the slave; and a register portion. The register portion comprises a control program for the driving portion. The control program comprises a plurality of functions, and the register portion stores control information to which are allocated all or a portion of the plurality of functions corresponding to all or to a portion of the plurality of program steps. The master issues a command specifying the program step to each of the slaves, each of the slaves receiving the command via the serial communication bus, and each of the control programs of the plurality of slaves determines a program step specified by the command based on the received command, and the slaves simultaneously execute the function relevant to the relevant program step based on the control information.

In other words, the control program stored in the register has a plurality of program steps divided each other, and functions executed based on the commands are defined for the program steps; and the serial communication system is characterized in that the master issues specifications to the slaves, via serial communication, of the plurality of steps, and by simultaneous execution by each of the slaves of the specified program steps, the master simultaneously controls the plurality of slaves.

By means of this invention, a serial communication system can be provided which enables simultaneous control of a plurality of slaves through commands issued from a master to the plurality of slaves by means of serial communication.

BRIEF DESCRIPTION OF THE DRAWINGS

FIG. 5 is a table used to explain the first aspect of control operation of a plurality of slaves;

DESCRIPTION OF EXEMPLARY EMBODIMENTS

Figure 1:
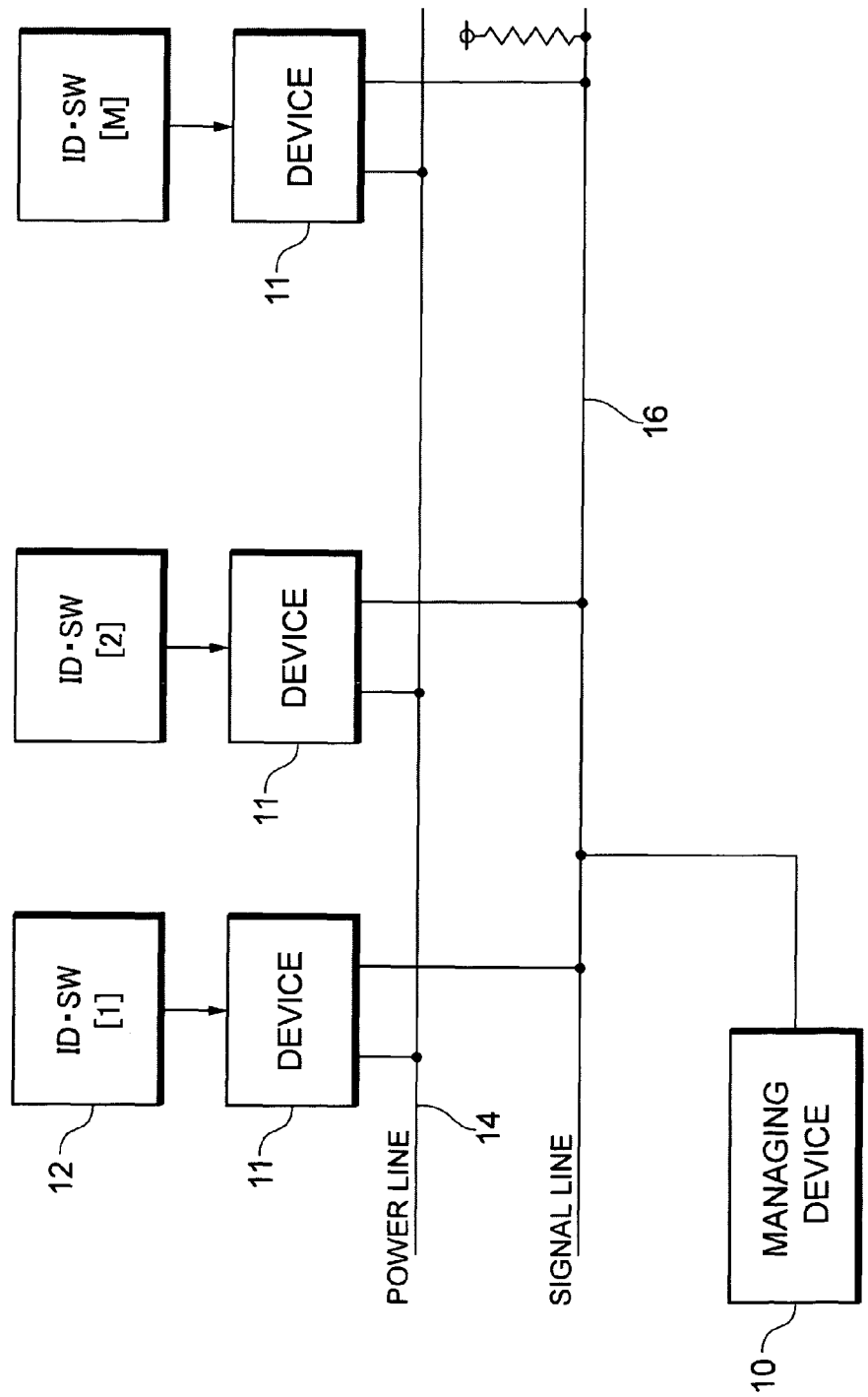
FIG. 1 is a block diagram of a first aspect of a serial communication system of this invention.

Next, aspects of the invention are explained. FIG. 1 is a block diagram of a serial communication system of the invention. Communication lines between a plurality of devices are for example configured using an I2C bus. This I2C bus is formed from two signal lines, which are a serial clock line and a serial data line.

A plurality of slaves (devices) 11 are connected to the serial communication line 16. Power is supplied to each of the devices by a common power line 14. A switch 12 which provides an ID is provided for each device. The symbol 10 denotes the managing device (master). Each of the devices is a managed device which is managed by the managing device 10, and is equivalent to a slave on the I2C bus.

Figure 2:
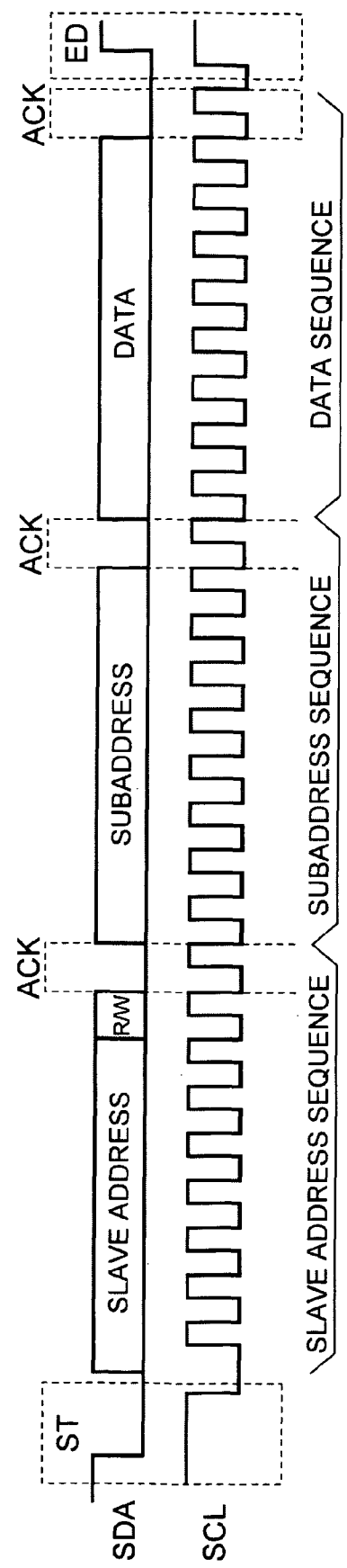
FIG. 2 is a serial communication timing chart for a normal I2C bus format.

FIG. 2 is a timing diagram of the communication method for an I2C bus connecting devices through serial communication. Communication is realized in synchronization with a serial clock (SCL). The managing device (master) outputs SCL and controls the communicating devices (slaves). Interface signals between devices are driven using open drain output, in order to connect the outputs of a plurality of devices; the devices output low level, and high level is supplied using pull-up resistances. Communication is performed synchronized to the clock SCL. Normally the master outputs SCL, and communication is performed by having the transmitting device modify the serial data during the intervals in which SCL is low level and hold the data during the intervals in which SCL is high level.

The serial data line is used for data transfer in synchronization with SCL. Data can be transmitted from either the master or a slave. When SCL is low level, the serial data (SDA) changes. When SCL is in the high state, if SDA changes, the change acts as a control signal such as a start condition (ST) or stop condition (ED).

When the master starts communication, initially the bus right-to-use must be acquired. Hence the master issues the start condition. This is accomplished, in the state in which SLC is high level, by dropping SDA to low level. In succession to the start condition, the master outputs a seven-bit slave address, and one bit indicating the transfer direction, for a total of eight bits, to specify the slave.

When communication with the slave is established, data transfer begins. In a wait state with SCL dropped to low level, the slave performs communication preparations for the transfer direction specified by the eighth bit of the address, and when preparations are completed stops dropping SCL to low level. Then the master can control SCL, and data can be transferred from the master using SCL.

Data transfer is performed in eight bit units. The device receiving data returns an acknowledge signal. When transferring data from master to slave, upon receiving data the slave returns an acknowledge signal (ACK) to the master. When the master receives data, by not returning an acknowledge signal for the final received data, the master notifies the slave of the end of communication. Because no acknowledge signal is received, the slave judges that communication has ended, halts subsequent communication, and sets SDA to high level.

When data transfer ends, the bus is released. To do so, with SCL in the low state, the master sets SDA low level, and sets SCL high level. In this state, when SDA goes high level, a stop condition is sent.

Figure 3:
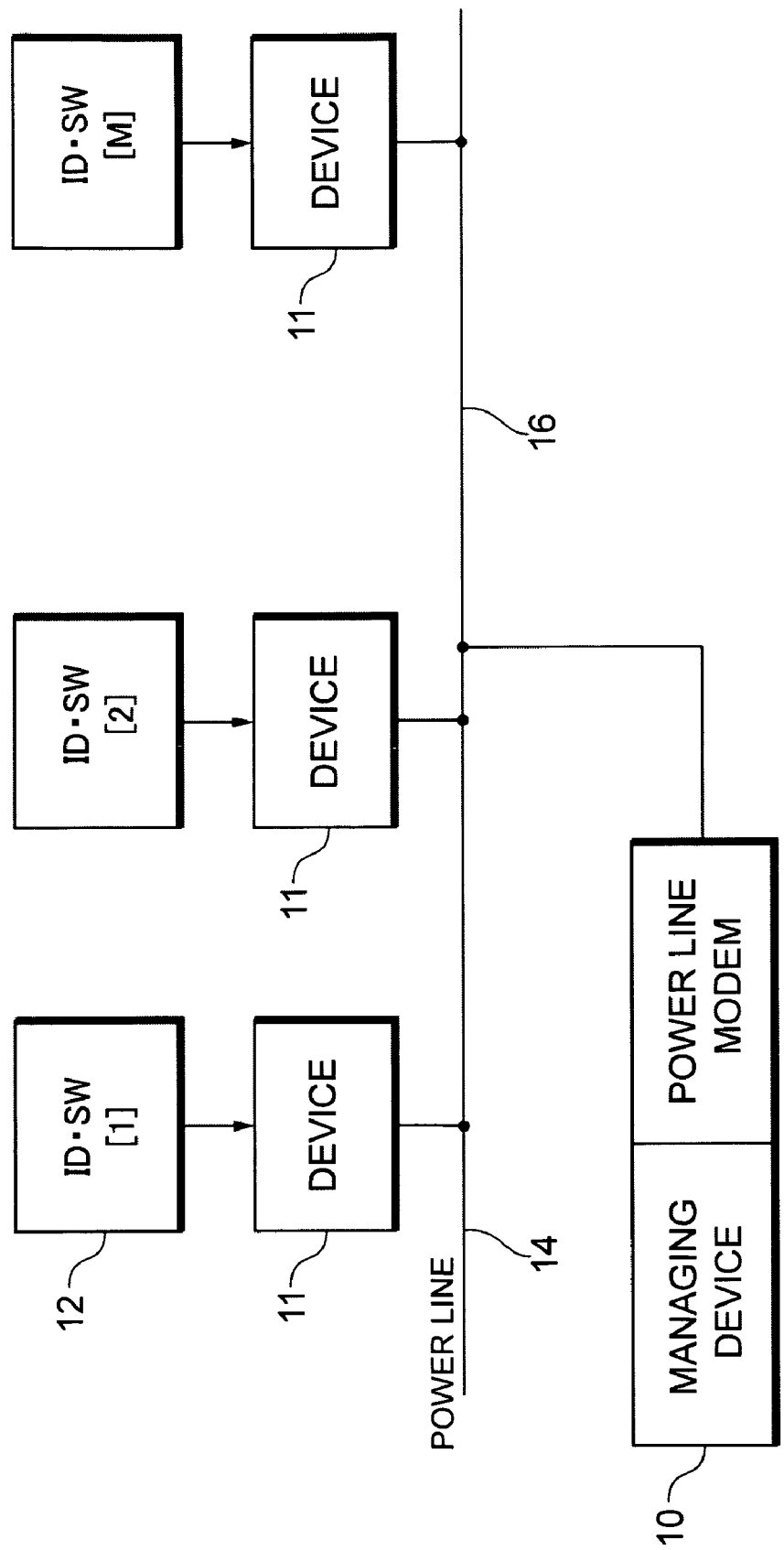
FIG. 3 is a modified example of FIG. 1.

In FIG. 1, serial communication between the managing device (master) 10 and each of the managed devices (slaves) employs an interface based on the 12C communication shown in FIG. 2. FIG. 3 is a modified example of FIG. 1, showing an example of a configuration employing the communication line and power line of FIG. 1 in the form of a power line modem 16.

Figure 4:
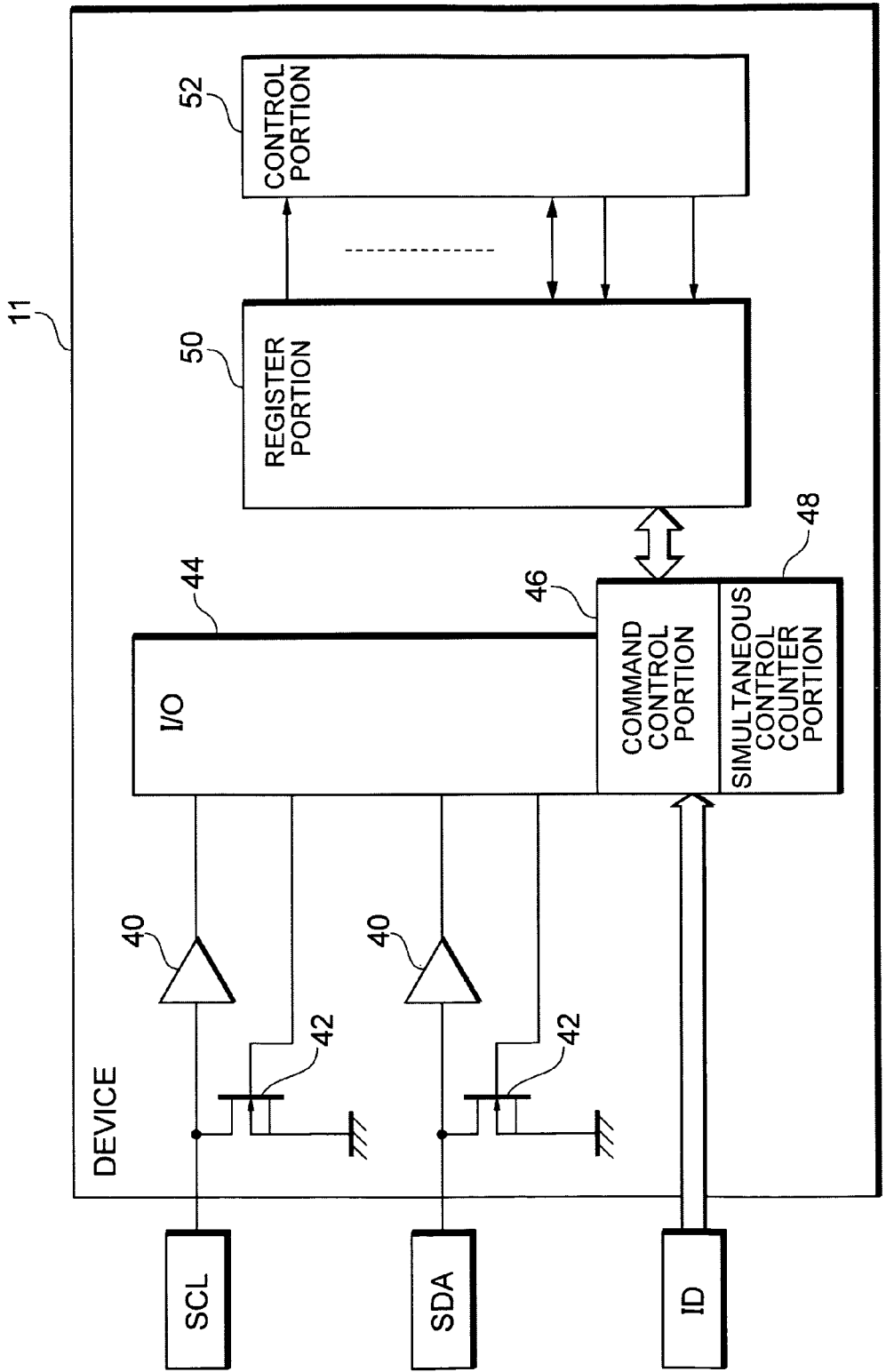
FIG. 4 is a block diagram showing the first aspect of a slave.

FIG. 4 is a block diagram of each of the slaves. As stated above, interface signals between master and slaves are driven by open-drain output. That is, the collector output of the transistors 42 is output to the buffer 40 without modification.

Each device (slave) has an I/O portion 44, command control portion 46, simultaneous control counter portion 48, register portion 50, and control portion 52. The I/O portion 44 controls I/O between the slave and the master. The command control portion 46 recognizes and analyzes IDs issued from an ID switch as well as commands based on various signals formed from combinations of the SCL and SDA, and controls the register portion 50 based on the counter value in the simultaneous control counter portion 48.

A control program for the control portion 52 is stored in the register portion 50; the register portion receives control from the command control portion 46 and enables access by the control program of the control portion 52. Based on the control program, the control portion 52 realizes a plurality of functions of this program. The control portion 52 is for example a driving circuit which controls an actuator of the device. If the device is a motor, then the control portion 52 is the driver circuit for the motor.

Operation of the device (slave) consists of 1:1 control between master and slave (peer-to-peer communication), similarly to I2C bus designs of the related art, and the simultaneous multiple control of this invention between master and a plurality of slaves. The command control portion 46 recognizes commands to distinguish between peer-to-peer communication and simultaneous multiple control, and causes execution of the respective types of control.

FIG. 5 is a table used to explain simultaneous multiple control. In this table, device IDs are the IDs of slaves, and correspond to the slave address. A simultaneous control program step is recognized by the simultaneous control counter portion 48. The simultaneous control counter portion 48 cumulatively counts the number of program steps based on the combination of SDA and SCL. The combination of SDA and SCL is explained below.

In FIG. 5, the slave with device ID "1" executes the operation of a function 11 in the stage of program step 0. As already explained, functions are accomplished by the control portion 52. The control program stored in the register portion 50 realizes the various functions shown in FIG. 5. The details of the control program and functions differ according to the operations to be realized by each device. Next, the slave with device ID "1" executes the function 12 in the stage of program step 2, without executing a function in the stage of program step 1. In FIG. 5, those for which definition is not made are showed with "–".

Seen from another perspective, FIG. 5 shows that, in the stage of program step "1", device 1 does not execute a function, but device 2 executes function 22, device 3 executes function 31, and device M executes function M1, and that these functions are effectively performed simultaneously by the plurality of slaves.

A plurality of slaves are controlled simultaneously in, for example, cases such as when performing integrated control of an entire robot through simultaneous control by a controller of each of the actuators of the robot.

In order to accomplish the control based on FIG. 5, the correspondence relation between a plurality of program step stages and the corresponding functions is programmed in the register portions 50 of each slave. The register portion 50 receives a control from the command control portion 46, and causes execution by the control portion 52 of functions stipulated by the program step stages. Each time the number of program steps is incremented by the simultaneous control counter portion 48, each of the plurality of slaves simultaneously executes the function for the step stage.

When setting conditions for simultaneous control of a plurality of slaves, the managing device accesses the register portion 50 of each slave by performing peer-to-peer communication in order, and sets in the register portion 50 a program (data) to determine simultaneous control conditions.

Figure 7:
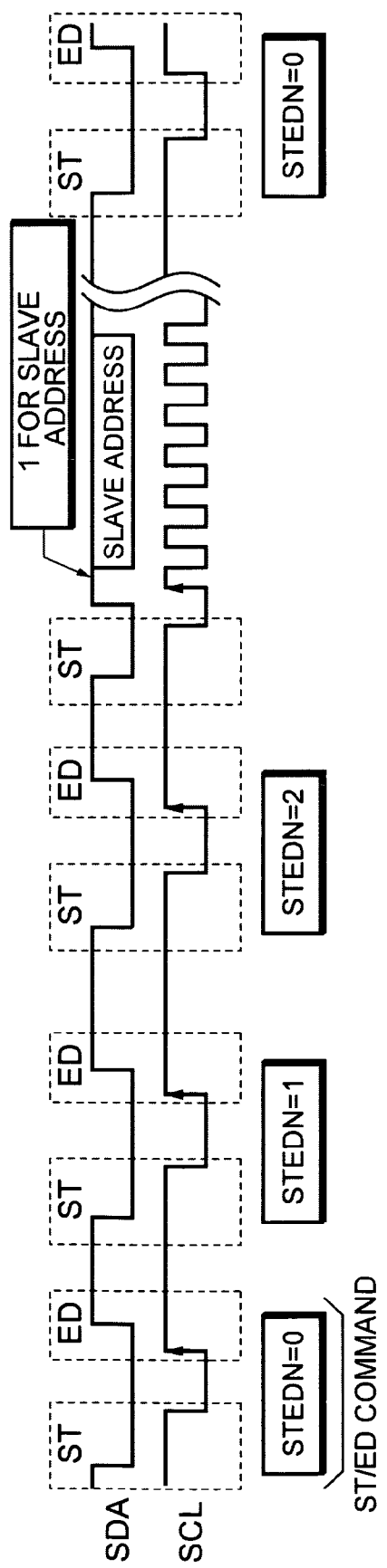
FIG. 7 is a timing chart between master and slave in the first aspect.

FIG. 7 is an SDA and SCL timing chart to realize the control method of FIG. 5. In FIG. 7, ST is the start condition, and ED is the stop condition. FIG. 7 defines the start of control in FIG. 5 and the number of program steps when a stop condition is formed following a start condition. FIG. 2 is a sequence format indicating peer-to-peer communication. If the communication format of FIG. 7 is designed such that, in addition to the I2C bus communication conventions, the master and slave operate based on these conventions, then in addition to the one-to-one communication between master and slave, the master can simultaneously control a plurality of slaves.

In FIG. 7, by setting the initial bit of the slave address to "1" in the slave address sequence (see FIG. 2) issued after the start condition from the SDA, a plurality of slaves are released from the simultaneous control of FIG. 5, and initiate normal peer-to-peer communication. At this time, the slave simultaneous control counter is reset. By thus defining the I2C bus conventions between master and slaves, it is possible to differentiate between the peer-to-peer communication and the simultaneous control of a plurality of slaves of FIG. 5 in communication between the master and a plurality of slaves, even when using the same I2C bus. In FIG. 2, a "subaddress" is an address related to a sub-device within a slave, specified by a slave address. To explain with respect to FIG. 4, the address of the register portion 50 is the subaddress.

Figure 6:
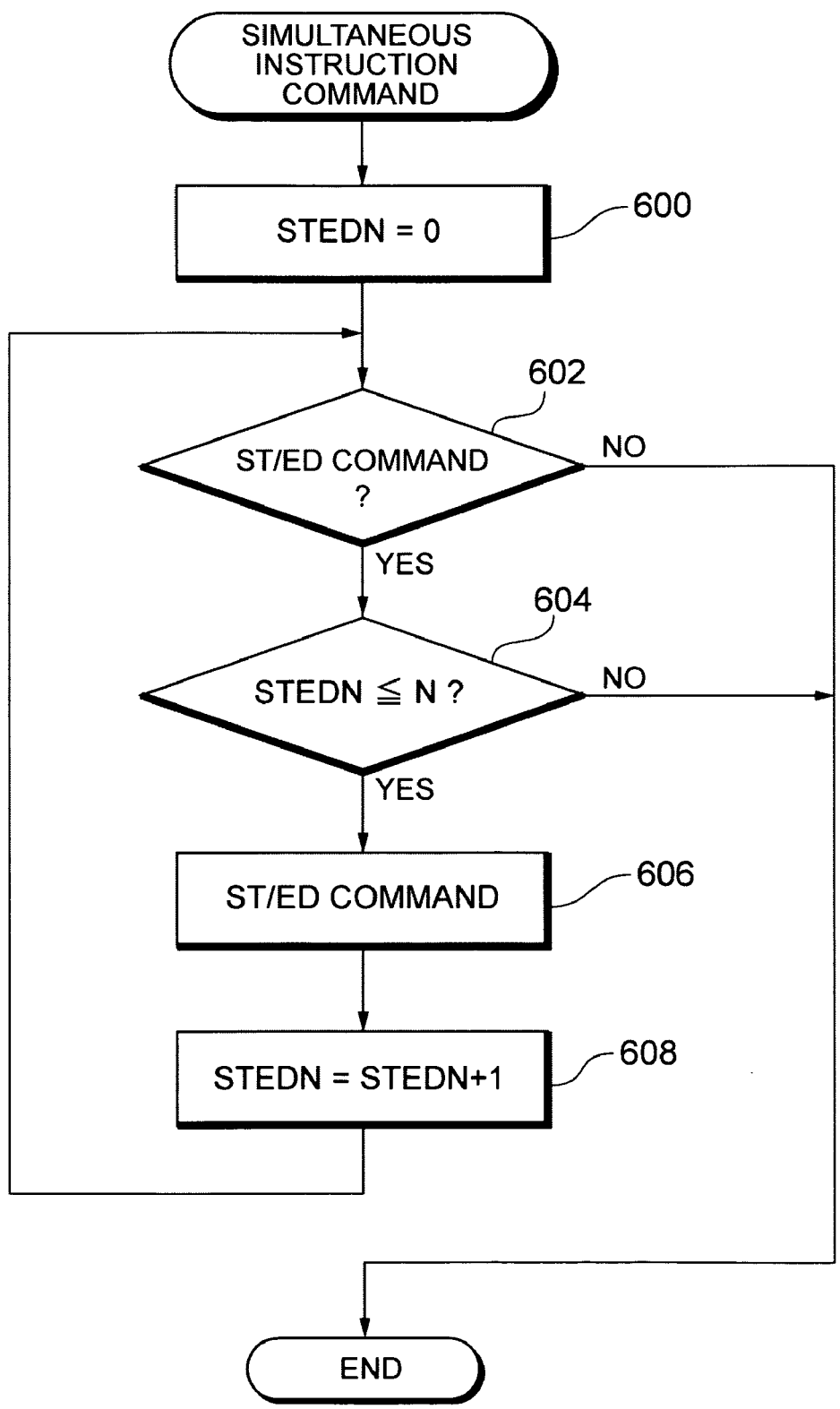
FIG. 6 is a flowchart showing slave operation in the first aspect.

FIG. 6 is a flowchart showing operation of the simultaneous control program counter when focusing on one certain slave. Upon initially recognizing the ST and ED commands as shown in FIG. 7, the command control portion 46 of this slave recognizes these as a simultaneous control instruction command.

At this time, the counter value of the simultaneous control counter portion 48 is reset, and so after setting the counter value (STEDN) to "0" (600), the slave command control portion 46 analyzes the command issued from the master via SCL and SDA (602), and when an ST/ED command is not confirmed (NO), processing ends. An ST/ED command is an ST/ED pair, shown in FIG. 7.

Upon confirming an ST/ED command (YES), a check is performed as to whether the count value of the program step counter portion is N (maximum value) or less (604). If the command control portion returns a negative judgment for this check (NO), processing ends; if a positive judgment results, processing proceeds to step 606 and beyond. In step 606, when the command control portion recognizes a new ST/ED command, in step 608 the program control portion increments the count value of the program step counter portion by one, and returns to step 602. According to the flowchart of FIG. 6, when the program control portion recognizes a simultaneous instruction command issued from the master, until a simultaneous instruction cancellation command, that is, a slave address with initial bit "1" in FIG. 7, is received, counting-up of program steps until the maximum value N is executed. As a result, in the process of incrementing the count value of the program, the plurality of slaves simultaneously executes the control shown in FIG. 5.

Figure 8:
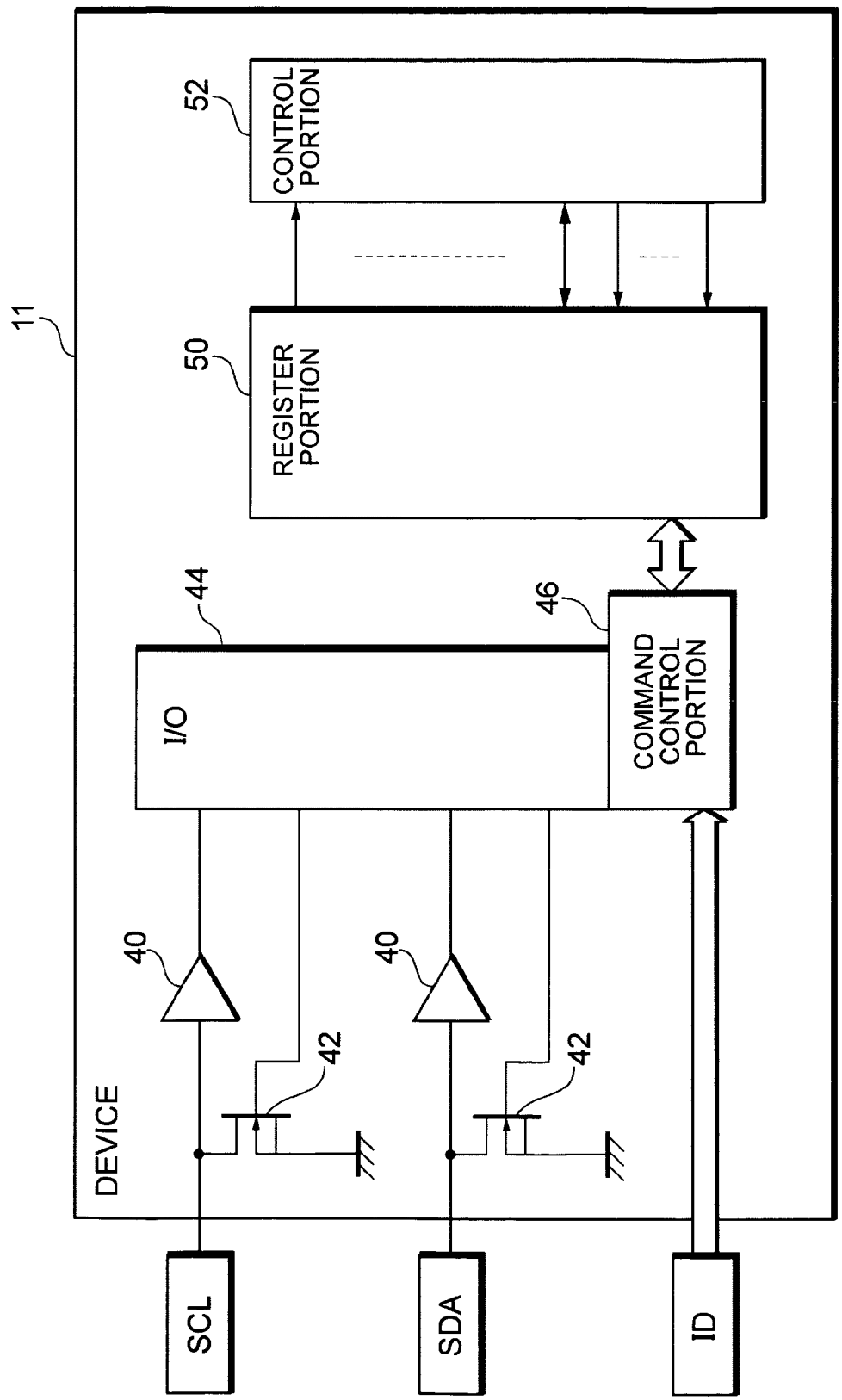
FIG. 8 is a block diagram of a second aspect of a slave.
Figure 9:
FIG. 9 is a table showing simultaneous control between a plurality of slaves, in the second aspect.

Next, a second aspect is explained. A difference of this aspect from the above aspect is that, as shown in FIG. 8, each of the slaves is not provided with the simultaneous control counter 48 of FIG. 4. As a result, as shown in FIG. 8, each device executes specific program steps through instructions from the master. This operation is explained based on the table of FIG. 9. In FIG. 9, numerals specified by the symbol a are numerals representing functions (programs) equivalent to program step numbers relevant to a specific slave. For example, the figure indicates that the device with ID 1 executes function 10 in program step 0, executes function 11 and function 12 in step 1, and executes function 12 and function 13 in step 2.

Figure 12:
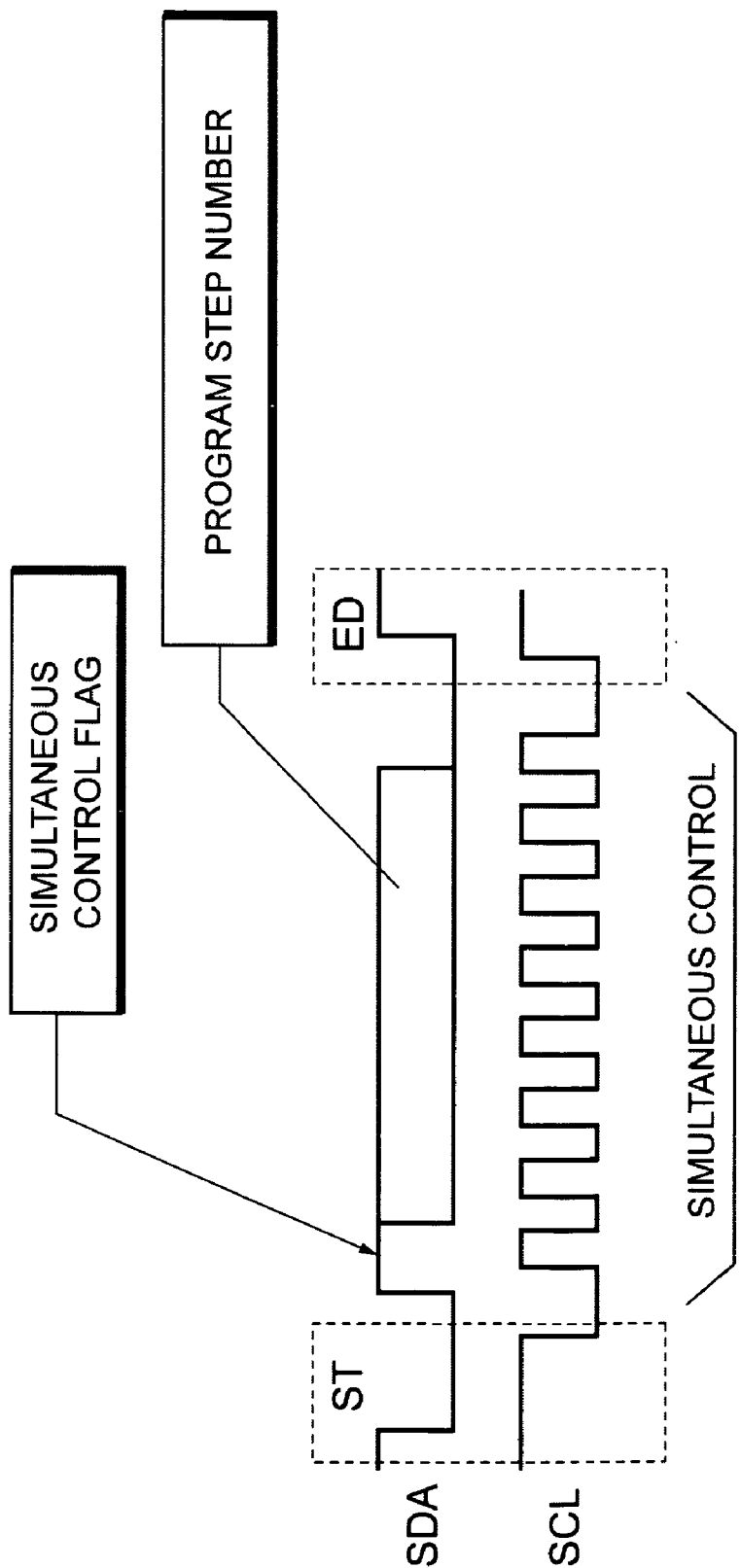
FIG. 12 is a timing chart explaining the format between master and slaves, in the second aspect.
Figure 13:
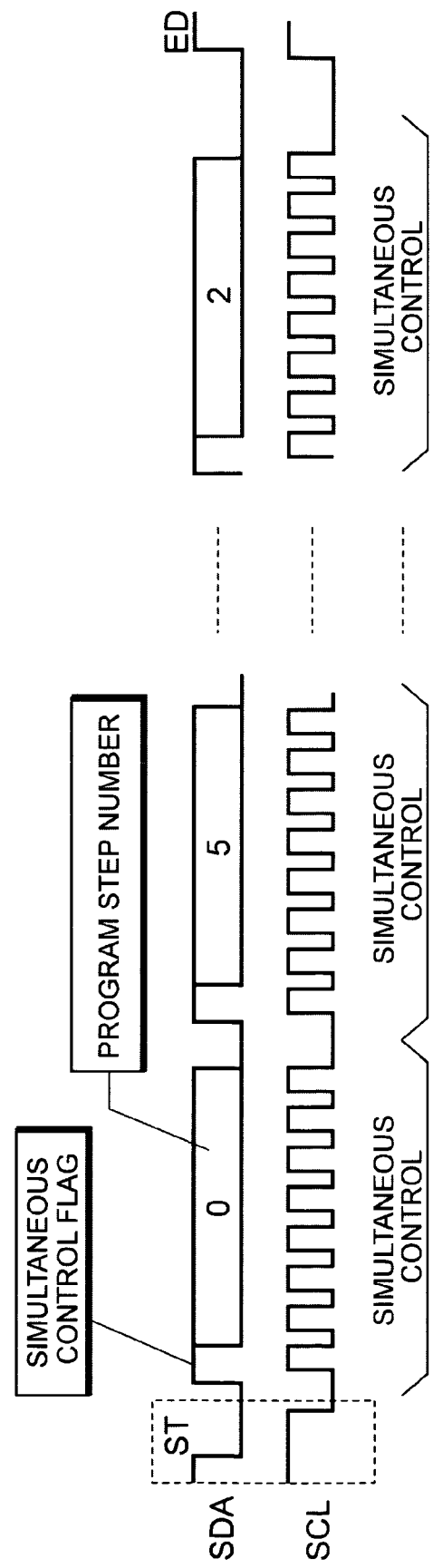
FIG. 13 is a timing chart explaining in more detail the timing chart of FIG. 12; and, FIG. 14 is an embodiment applying a serial communication system of this invention to a robot.

In order to realize the control shown in FIG. 9, the master and slaves recognize a flag which, in the first bit of the slave address following a start condition, differentiates peer-to-peer control from simultaneous communication control, as shown in FIG. 12 and FIG. 13. When a slave recognizes this flag as "0", control is recognized as P2P control, and when the flag is recognized as "1", simultaneous communication control is recognized. In FIG. 12, a slave recognizes the simultaneous control flag, and then recognizes a program step number sent from the master. FIG. 13 shows the manner in which a simultaneous control flag and a program step number following this flag, sent from the master, are sent in succession to a slave. The program step number is an arbitrary number sent from the master to the slaves.

As is seen from FIG. 12 and FIG. 13, the same signal line can be used to configure both peer-to-peer communication means to access a slave, selected by the master from among a plurality of slaves, for peer-to-peer control, and simultaneous serial communication means to perform access of all slaves for simultaneous control by the master of all of the plurality of slaves.

Figure 10:
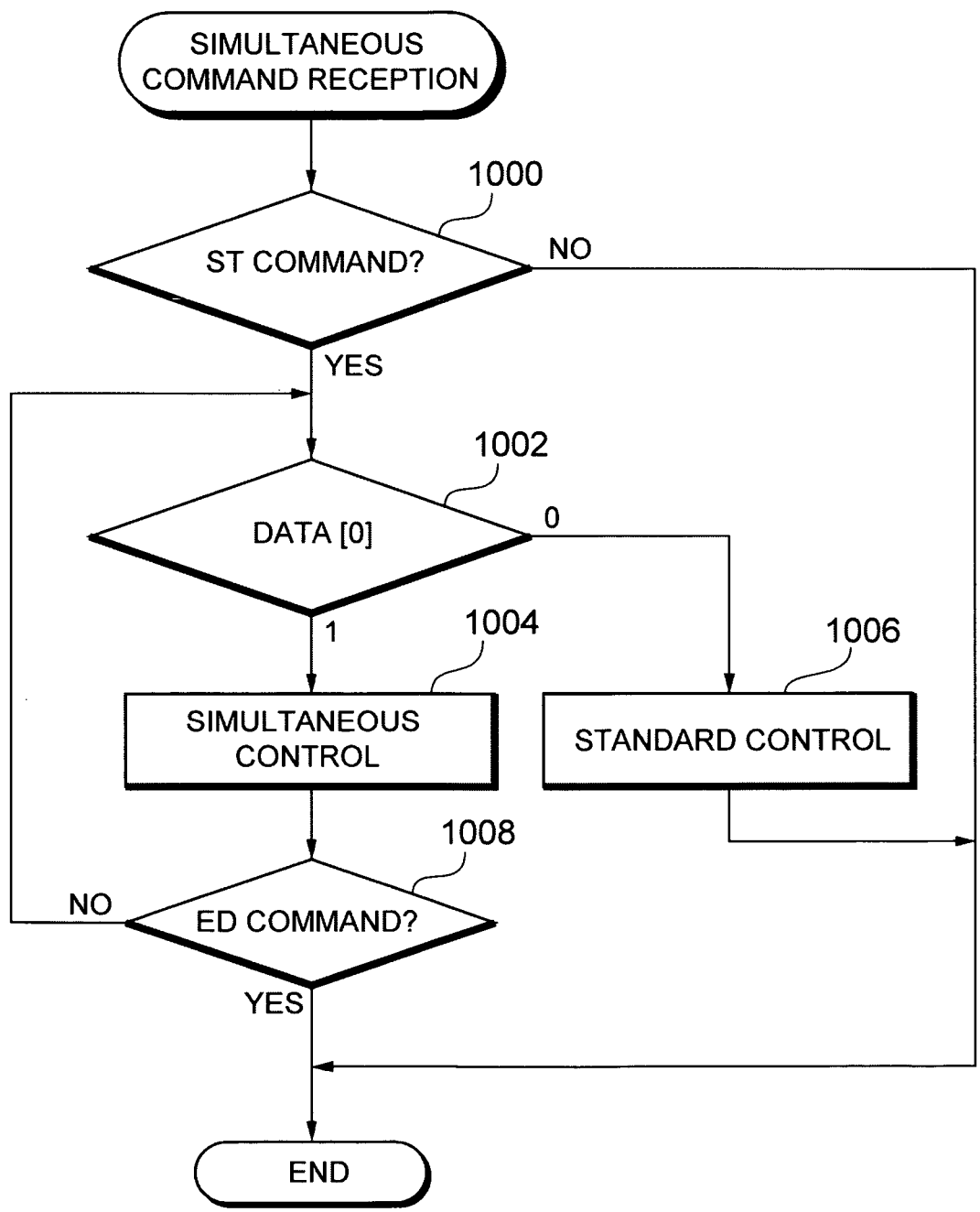
FIG. 10 is a flowchart explaining this control operation.

FIG. 10 is a flowchart for differentiation by a slave of P2P communication and simultaneous multiple control communication. The command control portion of the slave checks whether an ST command has been received in step 1000 (1002). If an ST command has not been received, processing ends. In the case of an ST command, the first bit of the slave address is checked. If an ST command has not been received, processing ends.

If the first bit is "1", then a plurality of slaves are controlled simultaneously, as shown in FIG. 12 and FIG. 13 (1004). If the first bit is "0", then the slave executes peer-to-peer control (FIG. 2) (1006). Next, when the slave receives an ED command, processing ends (1008). When an ED command is not received, processing returns to step 1002.

Figure 11:
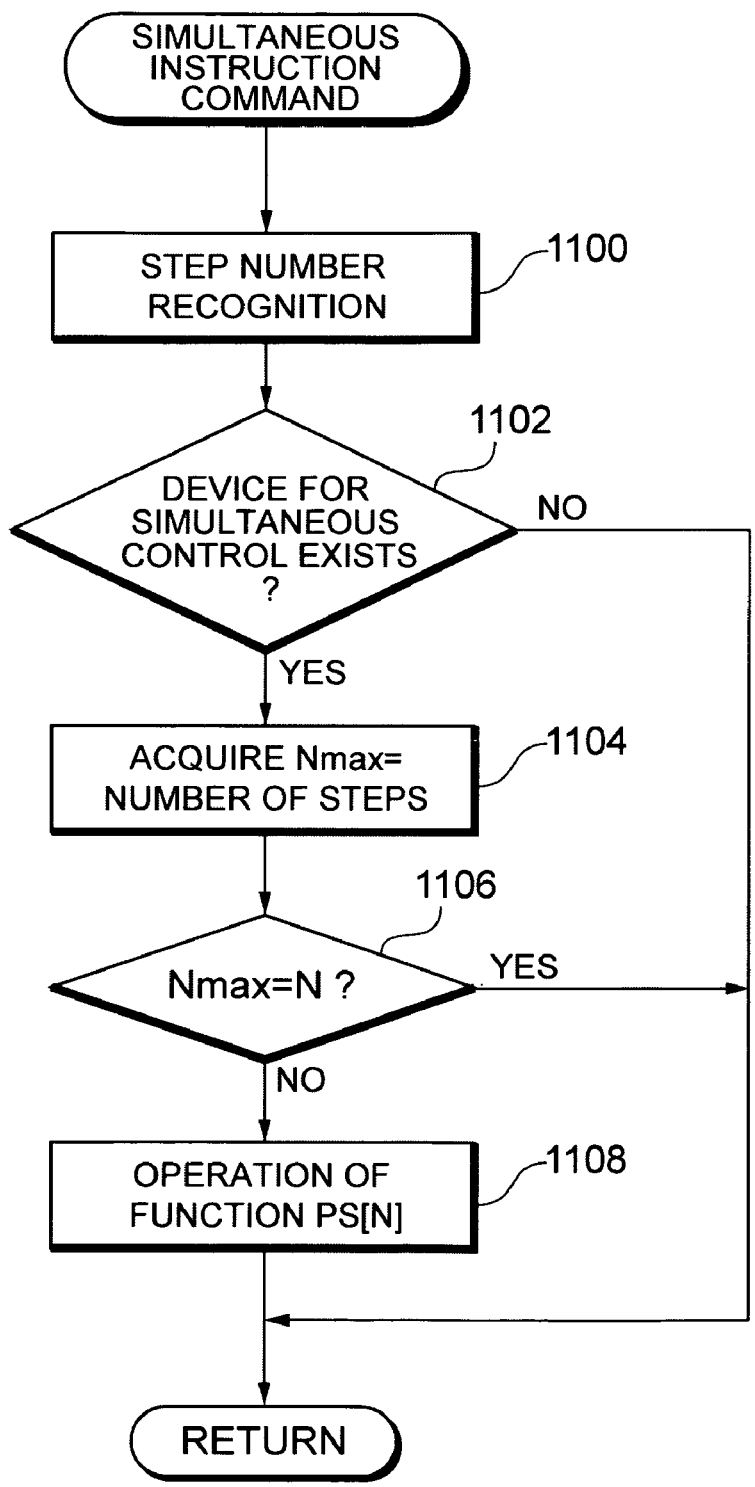
FIG. 11 is another flowchart explaining this control operation.

FIG. 11 is a flowchart for execution of processing for simultaneous control by the master of a plurality of slaves. In steps 1100, 1102, the command control portion of a slave checks the correspondence relation (see FIG. 9) between the step numbers of storage areas in the register portion and functions (devices), and determines whether there is a device (function) equivalent to the step number (1102). If the result of this judgment is negative, processing ends. If the result of this judgment is positive, in step 1104 the command control portion reads the maximum number of steps, and compares the number of steps acquired by the slave from the master with the maximum number of steps (1106); if the read-out number of steps is the maximum number of steps, processing ends. If the result of this judgment is positive, the slave executes the function corresponding to the corresponding number of steps (1108). Through the processing of FIG. 11, the slave performs the functions of program step numbers specified by the master.

Embodiment 1

Next, an embodiment utilizing a serial communication system of the invention is explained.

FIG. 14 illustrates a case in which a serial communication system of the invention is applied to a robot. As shown in FIG. 14, this robot 100 is provided with a base 102, main shaft 104, first arm 106, second arm 108, head portion 110, rotating shaft 112, gripping portion 114, first motor 120, second motor 130, and third motor 140.

The managing device (master) 10 of this serial communication system of the invention is provided in the base 102, and slaves (devices) 11 are provided at each of the first motor 120, second motor 130, and third motor 140, so as to enable driving of the respective motors. A serial communication line 16 is distributed from the managing device 10 to each of the slaves 11. A functional block such as in FIG. 4 or FIG. 8 is provided in each of the slaves 11 controlling a motor, and a control program for simultaneous multiple control, relating to driving to be executed at each motor, is stored in the register portions 50.

The managing device 10 need not be installed within the robot 100, and the managing device may be provided outside the robot.

The first arm 106 is controlled by the first motor 120 so as to rotate through an arbitrary angle relative to the main shaft 104; the second arm 108 is controlled by the second motor 130 so as to rotate through an arbitrary angle relative to the first arm 106. The third motor 140 can rotate the rotating shaft 112 through an arbitrary angle, and moreover can cause extension and contraction in the shaft-direction, as well as placing the gripping portion 114 into the gripping state or into the releasing state with arbitrary timing.

In the above configuration, the managing device 10 moves the position of the head portion 110 to an arbitrary position, brings the tip position of the gripping portion 114 into proximity with an arbitrary object, and causes gripping and releasing to perform a task, by executing serial communication for simultaneous multiple control of this invention of each of the slaves 11 controlling the first motor 120, second motor 130, and third motor 140. By providing a control program so as to enable simultaneous multiple control, the motors can be made to operate simultaneously in cooperation. A serial communication system of this invention can be said to be suitable as a communication system for robots such as that described above, provided with a plurality of movable portions.

In the above explanation, it is preferable that serial communication between master and slaves be based on an I2C bus; but other means of communication are possible. By means of the above-described aspects, a multiplexed program can be executed by a specified plurality of devices; programs which are be interlocked by serial communication can be easily set in a plurality of slaves; and interlocked programs which are made to operate simultaneously with an appliance in the home by means of power line transmission can be easily installed. This invention can be applied to robot technology, to appliances employing power line transmission, and to control of a plurality of vehicles using power supply transition.

What is claimed is:

1. A serial communication system, comprising:
   a master;
   a plurality of slaves; and
   a serial communication bus connecting the master and the plurality of slaves,
   the master being configured so as to perform peer-to-peer control, via the serial communication bus, of the plurality of slaves,
   each of the plurality of slaves having:
     an I/O portion for controlling communication with the master;
     a control portion for controlling a driving portion of the slave; and
     a register portion, the register portion comprising a control program for the driving portion, the control program comprising a plurality of functions, and the register portion storing control information to which are allocated all or a portion of the plurality of functions corresponding to all or to a portion of the plurality of program steps,
   the master issuing a command specifying the program step to each of the slaves, each of the slaves receiving the command via the serial communication bus, and
   each of the control programs of the plurality of slaves determining a program step specified by the command based on the received command, and the slaves simultaneously executing the function relevant to the relevant program step based on the control information, the command stipulating the program steps being inserted into communication on the serial communication bus, the master issuing information specifying the program step to the plurality of slaves according to relevant commands, and each of the plurality of slaves receiving the information executing the functions in the control programs corresponding to the specified program steps.

2. The serial communication system according to claim 1, the serial communication bus comprising a serial clock line and a serial data line, and the serial bus realizing communication between the master and the slaves through combinations of the serial clock and the serial data.

3. The serial communication system according to claim 2, in communication on the serial communication bus, information being inserted to differentiate between normal communication control, in which the master issues an address of a specific slave from among the plurality of slaves and performs peer-to-peer communication with the slave specified by the specific slave address, and simultaneous communication control, in which simultaneous communication with the plurality of slaves is performed in order to simultaneously control the plurality of slaves.

4. The serial communication system according to claim 3, the master and the slaves recognizing the program step through the combination of a start condition and a subsequent stop condition.

5. The serial communication system according to claim 4, the master continuously issuing to the plurality of slaves the combination of the start condition and the stop condition, each of the plurality of slaves comprising a counter of the program steps, and the control portion of each slave executing, in order, the functions specified by the plurality of program steps, measured, in order, by the counter.

6. The serial communication system according to claim 3, the differentiating information being information relating to a first bit of the slave address sequence following the start condition issued from the master to the plurality of slaves.

7. The serial communication system according to claim 1, the master simultaneously issuing, to the plurality of slaves, information specifying the number of the specified program steps, and each of the plurality of slaves which has received this information specifying functions corresponding to the specified steps from information specifying relation between the number of the program steps and the functions, and simultaneously executing the specified functions.

8. A serial communication system, comprising:
   a master; and
   a plurality of slaves connected to the master via a serial communication unit,
   each of the plurality of slaves comprising:
     a unit that analyzes a command issued from the master; and
     a register that stores a control program based on the command,
   the control program stored in the register being divided into a plurality of program steps,
   in each of the program steps, a function to be executed based on the command being defined,
   the master specifying the program steps for the plurality of slaves through the serial communication, and
   the master simultaneously controlling the plurality of slaves through the simultaneous execution, by each of the plurality of slaves, of specified program steps, the command stipulating the program steps being inserted into communication on the serial communication bus, the master issuing information specifying the program step to the plurality of slaves according to relevant commands, and each of the plurality of slaves receiving the information executing the functions in the control programs corresponding to the specified program steps.

9. The serial communication system according to claim 1, the master being a robot controller, and the slaves being drive portions included in the robot.

10. A serial communication protocol, in a serial communication system comprising: a master, a plurality of slaves, and a serial communication bus, the serial communication bus comprising a serial clock line and a serial data line, and the serial communication bus connecting the master and the plurality of slaves to realize communication between the master and the plurality of slaves through combinations of the serial clock and serial data, so as to enable the master to control the plurality of slaves, information being inserted to differentiate between normal communication control, in which the master issues a slave address specifying a slave from among the plurality of slaves and peer-to-peer communication is performed with the slave specified by the specified slave address, and simultaneous communication control, in which simultaneous communication is performed with the plurality of slaves in order to simultaneously control the plurality of slaves, the command stipulating the program steps being inserted into communication on the serial communication bus, the master issuing information specifying the program step to the plurality of slaves according to relevant commands, and each of the plurality of slaves receiving the information executing the functions in the control programs corresponding to the specified program steps.

\* \* \* \* \*